(12) United States Patent
Barnett et al.

(10) Patent No.: US 8,503,661 B2
(45) Date of Patent: Aug. 6, 2013

(54) SINGLE WORKFLOW FOR COLLOBORATIVE NETWORK ROUTING OVER HETEOGENEOUS SYSTEM

(75) Inventors: James Barnett, Auburndale, MA (US); Michael Ely, Pelham, NH (US)

(73) Assignee: Aspect Software, Inc., Westford, MA (US)

( * ) Notice: Subject to any disclaimer, the term of this patent is extended or adjusted under 35 U.S.C. 154(b) by 1405 days.

(21) Appl. No.: 12/114,396

(22) Filed: May 2, 2008

(65) Prior Publication Data

US 2009/0274291 A1    Nov. 5, 2009

(51) Int. Cl.
*H04M 3/00*    (2006.01)
*H04M 5/00*    (2006.01)

(52) U.S. Cl.
USPC ............ 379/265.02; 379/265.01; 379/265.13; 379/266.07

(58) Field of Classification Search
USPC ............... 379/265.01–266.1, 266.02, 266.03, 379/266.04, 266.05, 266.06, 266.07, 266.08, 379/266.09
See application file for complete search history.

(56) References Cited

U.S. PATENT DOCUMENTS 6,229,888 B1 * 5/2001 Miloslavsky ............ 379/265.01
7,657,263 B1 * 2/2010 Chahrouri et al. ............ 455/445

* cited by examiner

*Primary Examiner* — Khai N Nguyen
(74) *Attorney, Agent, or Firm* — Hutsch Blackwell LLP

(57) ABSTRACT

A method and apparatus are provided for handling contact requests among a plurality of dissimilar automatic contact distributors. The method includes the steps of providing a plurality of workflows scripts, translating each of the plurality of workflows scripts into a respective native language of each of the plurality of dissimilar automatic contact distributors. The method further includes the steps of tendering a request for a contact to the plurality of dissimilar automatic contact distributors, selecting a automatic contact distributor of the plurality of dissimilar automatic contact distributors to handle the contact based upon a response from at least some of the plurality of dissimilar automatic contact distributors and transferring the contact to the selected automatic contact distributor.

31 Claims, 1 Drawing Sheet

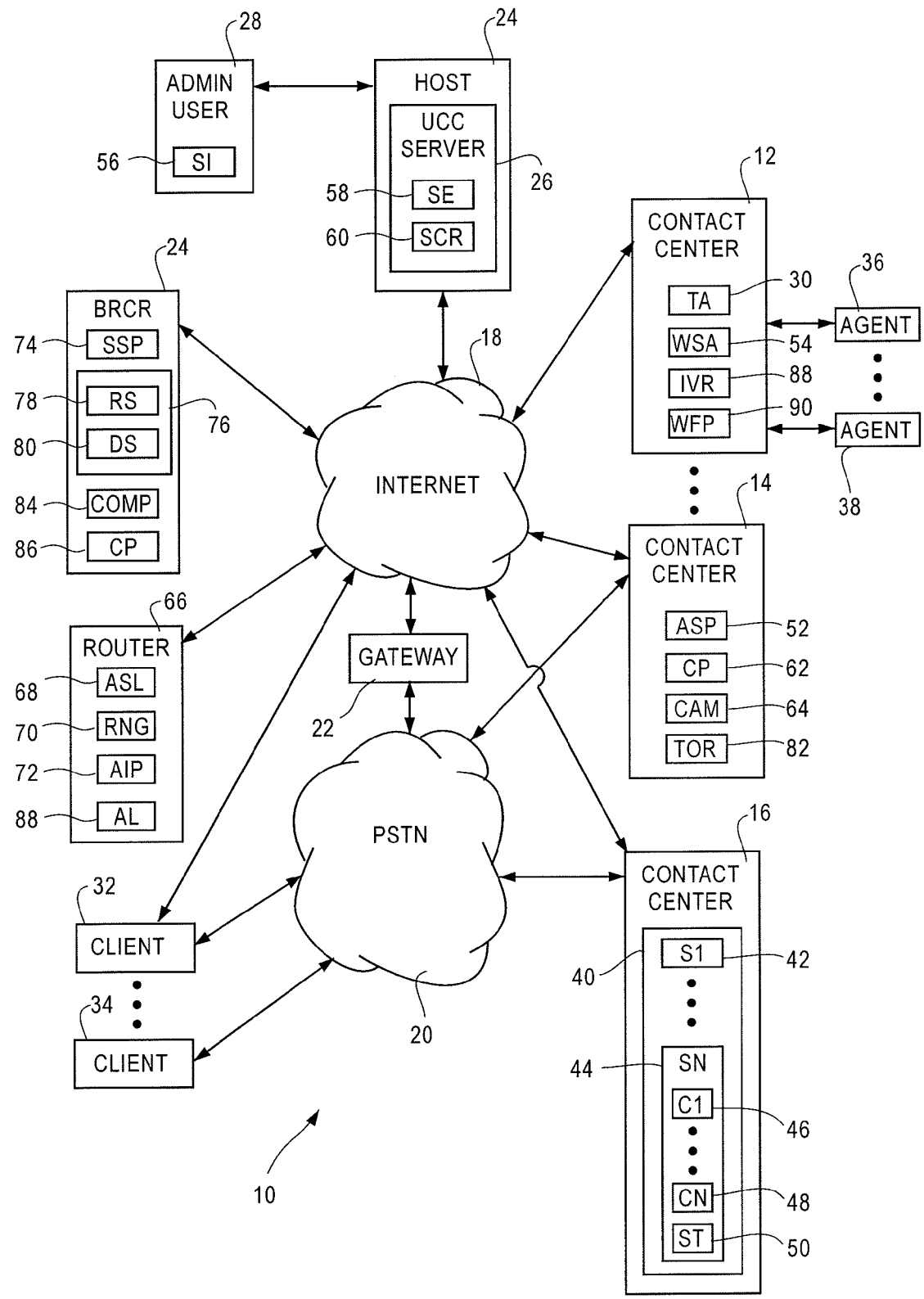

SINGLE WORKFLOW FOR COLLOBORATIVE NETWORK ROUTING OVER HETEOGENEOUS SYSTEM

FIELD OF THE INVENTION

The field of the invention relates to communication systems and, more particularly, to automatic contact distributors.

BACKGROUND OF THE INVENTION

Call centers are generally known. Call centers are typically used wherever an organization has occasion to handle a multitude of individual contacts with clients. Usually, the organization will hire a number of agents to interact with clients through the call center.

Contacts between the organization and clients may be handled under any of a number of different communication mediums. For example, contacts may be initiated through the public switch telephone network (PSTN) by a client calling a telephone number provided by the organization. Alternatively, the organization may place telephone calls to its clients. In either case, connection of the telephone call with an agent may be handled by an automatic call distributor (ACD).

Similarly, contacts with clients through the Internet may be handled by a host of a contact center. Contacts in this case may be handled under a voice format (e.g., VoIP) or under a text format (e.g., e-mail, chat, etc.).

Once a call is detected, the ACD may select an agent to handle the call. The agent may be selected based upon qualifications in handling the type of call involved, based upon experience with the client involved or based upon idle time. Once an agent is selected, the ACD may automatically route the call to a telephone of the selected agent.

In order to serve large markets, ACD systems are often networked to include ACDs in many different locations. When used in such a context, the message traffic among ACDs becomes significant. Because of the importance of networked ACDs, a need exists for methods of reducing traffic among ACDs in networked systems.

SUMMARY

A method and apparatus are provided for handling contact requests among a plurality of dissimilar automatic contact distributors. The method includes the steps of providing a plurality of workflows scripts, translating each of the plurality of workflows scripts into a respective native language of each of the plurality of dissimilar call centers. The method further includes the steps of tendering a request for a contact to the plurality of dissimilar automatic contact distributors, selecting a automatic contact distributor of the plurality of dissimilar automatic contact distributors to handle the contact based upon a response from at least some of the plurality of dissimilar automatic contact distributors and transferring the contact to the selected automatic contact distributor.

BRIEF DESCRIPTION OF THE DRAWINGS

FIG. 1 is a block diagram of a contact distribution system in accordance with an illustrated embodiment of the invention.

DETAILED DESCRIPTION OF AN ILLUSTRATED EMBODIMENT

While call centers work well, they are constantly evolving and, in some cases, require replacement or expansion. When a call center made by a first call center provider must be replaced or expanded, the organization will often consider and may, in fact, purchase a call center from a competitor for use with existing, legacy call centers because of a lower price.

However, the software and operating philosophy used to control call centers may be radically different among call center providers. In order to allow call centers to exchange information, a software adapter or terminal adapter may be needed to allow a first call center to exchange information with a second call center.

Moreover, the information exchanged among call centers may be extensive. For example, agents often possess specialized knowledge that may be needed by clients throughout the call center system even though an agent with specialized knowledge may work at only one call center. In this case, the agent may be shared among the call centers of the call center system.

In order to share agents among call centers, a great deal of information may be shared among the call centers. Whenever a shared agent signs into the system, the information may be shared among the call centers at that time. Alternatively, shared agents sign into a single call center and wherever a call center needs an agent, the call center sends a list of the skills of the agent needed to the other call centers. The other call centers respond if they have an agent with that skill available.

Other information that may be shared among call centers may include an identification of call groups and the skills required by each call group. The identification of call groups and skills required by the call group is important in selecting an agent to handle a call.

FIG. 1 is a block diagram of an automatic contact distribution system 10 that provides unified control of a number of dissimilar automatic contact distribution subsystems 12, 14, 16 shown generally in accordance with an illustrated embodiment of the invention. The automatic contact distribution system 10 may be used by any of a number of different organizations (e.g., political, environmental, commercial) to handle interactions with clients.

As used herein, dissimilar automatic contact distributors are automatic contact distributors that provide substantially the same functionality, but may provide that same functionality based upon the use of different methods and/or hardware. Dissimilar automatic contact distributors may be made by the same or by different manufacturers (e.g., a Rockwell Spectrum automatic contact distributor, an Aspect call center, etc.).

Included within the automatic contact distribution system 10 may be a host 24 and number of automatic contact distributors (ACDs) 12, 14, 16. The host 24 and ACDs 12, 14, 16 may be interconnected via the Internet 18 (as shown in FIG. 1) or by a local area network (LAN) or wide area network (WAN).

The host 24 may include a unified command and control (UCC) server 26 coupled to the ACDs 12, 14, 16 through the Internet 18 and a respective terminal adapter 30. One or more administrative persons (users) working through a terminal 28 may control the activities of the ACDs 12, 14, 16 via operation of the server 26. While the admin user 28 is shown directly connected to the server 26 in FIG. 1, the terminal 28 may alternately be located remotely and connected to the server 26 through the Internet 24.

While the ACDs 12, 14, 16 may be different in structure and operation, the use of the terminal adapters 30 allow the system of FIG. 1 to be operated as if it were one large ACD. For example, the server 26 may have a substantially different control structure than any of the ACDs 12, 14, 16 and have very little in common with the ACDs 12, 14, 16. This allows the server 26 to operate under a "best of breed" philosophy where the terminal adapters 30 accommodate any differences.

In simple conceptual terms, the UCC server 26 sits on top of existing administrative interface applications and databases of the ACDs 12, 14, 16. "Sitting on top of" means that the administrative interfaces and databases of the ACDs 12, 14, 16 do not rely upon the admin system 10 for proper operation. The UCC server 26 uses the interfaces of the call systems 12, 14, 16 to read data from their databases and to write changes into them, but it does not attempt to replace them. Instead, the server 26 acts as a web wrapper, providing a unified view of administrative data, but not requiring any changes to the existing ACDs 12, 14, 16. As much as possible, server 26 simply acts as another client to the existing administrative interfaces of the ACDs 12, 14, 16, which allows the existing administrative tools to continue working independently, particularly in the case where the connection of the ACDs 12, 14, 16 with the server 26 is lost.

In effect, the server 26 controls the ACDs 12, 14, 16 by changing the data within the databases of the ACDs 12, 14, 16. This has the advantage that the ACDs 12, 14, 16 function properly without any other input or control from the server 26. If the server 26 should malfunction or otherwise become inoperative, then data may be entered directly through existing admin services available within the ACDs 12, 14, 16.

Since the server 26 merely changes data within the ACDs 12, 14, 16, there is no limit to the number of servers 26 within the system of FIG. 1. While one is shown in FIG. 1, the system of FIG. 1 may contain two or more.

Each of the ACDs 12, 14, 16 may have a number of agents 36, 38 associated with it. Each agent 36, 38, in turn, may be associated with a particular agent group based upon skill.

Contacts with clients 32, 34 may be handled under any of a number of different formats. For example, the organization that operates the system 10 may promulgate by advertising or otherwise one or more communication system port identifiers (e.g., telephone numbers, e-mail addresses, chat room identifiers, etc.) of the ACD system 10 through which human clients 32, 34 may contact agents 36, 38 of the organization. Clients 32, 34 may place calls through the PSTN 20, send e-mails through the Internet 18 or join chat rooms identified by the port identifiers and, in response, be placed in contact with agents 36, 38 of the organization. As used herein, a contact is a request for a communication session passed between a client 32, 35 and the ACD system 10.

Alternatively, the organization may initiate contacts with clients 32, 34 using port identifiers of clients previously saved within the ACD system 10 from previous contacts with the client 32, 34. Contacts may be initiated with clients 32, 34 for promotional activities or to provide information previously requested by a client 32, 34.

In either case, contacts with clients 32, 34 may be processed by the ACD system 10 in advance of selection of an agent 36, 38 to handle the contact. Selection of an agent 36, 38 to handle a contact may be based upon any criteria (e.g., agent idle time, skill, etc.).

Processing of contacts with clients 32, 34 may include determining an identity of a caller and any information regarding a purpose of the contact. The identity and purpose of the contact may be determined from contact associated information. For example, in the case of telephone calls, ANI and DNIS information delivered along with a call may provide the identifier of the caller and called party. Where the organization uses a number of different telephone numbers, knowledge about the number called can be used as an indicator of the purpose of the call.

Similar information may be obtained from e-mails and chat room information. In this case, the destination address of an e-mail or chat room that was joined may be an indication of the subject matter of the contact. Similarly, the source URL may be used to identify pre-existing clients 32, 34.

By knowing the identity of the client 32, 34 and purpose of a contact, the ACD system 10 can determine the best way to handle the contact to enhance the probability of a successful outcome. For example, if a contact (e.g., a telephone call) is received from a geographical location having a large spanish-speaking population, then it would be beneficial to route the call to a spanish-speaking agent 36, 38.

Routing of contacts within the system 10 is accomplished through the use of a number of contact workflow scripts 42, 44 executed by a processor or located within a memory 40 of each ACD 12, 14, 16. As used herein, each workflow script 42, 44 is a set of call routing instructions for a particular type of call where the scripts and/or instructions are embodied as one or more computer programs, routines or subroutines (hereinafter sometimes referred as applications).

Included within (or associated with) each workflow script 42, 44 is a criteria 46, 48 for identifying the type of contacts that are to be routed according to the script 42, 44. In effect, contacts are classified by type using the criteria 46, 48 and routed according to a predetermined set of routing steps 50 that have been assigned for use with the type of contact involved.

For example, at least some contact routing scripts 42, 44 may be used to classify and route contacts based upon one or more predefined, destination identifiers (e.g., telephone numbers, e-mail addresses, etc.). This may be useful in the case of an organization that sells different types of widgets (e.g., widget #1, widget #2, etc.). In this case, if the product is different, then the skills of agents 36, 38 selling the widgets may also be different. In order to sell widgets, the organization may use a first telephone number (e.g., telephone #1) for handling contacts for the first type of widget (i.e., widget #1) and a second telephone number for handling contacts for the second type of widget (i.e., widget #2).

In order to route calls according to this scenario, the organization may provide a first script (e.g., script 42) that uses telephone #1 as a criteria for acceptance and routing of the contact under script 42. Similarly, the organization may provide a second script (e.g., script 44) that uses telephone #2 as a criteria for acceptance and routing of the contact under script 44.

The routing steps 50 for each script 42, 44 may be based upon a pre-established routing or destination criteria for the contact type. The destination criteria may be based upon a subject matter or required skill for handling the contact. In this case, the objective of the routing steps may include the steps of transferring the contact to an agent assignment processor 52 that handles that type of contact. The contact may be transferred to the processor 52 along with an indicator of the subject matter or required skill for handling the contact. The processor 52, in turn, may identify and transfer the contact to the appropriate agent 36, 38 based upon the subject matter or required skill.

In other examples, the workflow scripts 42, 44 may be more complex. In more complex examples, the criteria 46, 48 may include both source and destination communication system identifiers. This may be important in cases where the organization wants to identify contacts with existing clients 32, 34 for special treatment. In these cases, the routing steps for a telephone call may include a first step of transferring the contact to an agent assignment processor 52 for assignment to a particular agent. If the agent is not available, the contact is placed in a wait queue. Alternatively, the contact may be transferred to an interactive voice response unit (IVR) 88 to collect more information about the purpose of the contact.

While the contact remains in the queue, a prompt may be periodically played for the benefit of the client 32, 34 allowing the client to leave a message. If the contact is not transferred to an agent 36, 38 within a predetermined time limit, then the contact may be transferred to another ACD 12, 14, 16.

In general, the workflow scripts 42, 44 used by a set of dissimilar ACDs 12, 14, 16 are different. For example, some ACDs 12, 14, 16 may use a single instruction to accomplish a single objective while other ACDs 12, 14, 16 require a multitude of steps to accomplish the same objective. More specifically, one ACD 12, 14, 16 may play a single audible prompt to each caller in a queue simultaneously. Another ACD 12, 14, 16 may be limited to playing a single prompt per call based upon the specifics of the caller.

Similarly, some ACDs 12, 14, 16 may allow a caller to be queued to multiple agent groups. Other ACDs 12, 14, 16 may only allow a caller to be queued to a single agent group, but allow the caller to be queued to another agent group after some predetermined time period.

In addition to differences in the way that workflow scripts operate, the syntax of each program step of the workflow scripts 42, 44 may also be different among ACDs 12, 14, 16. For example, at least some ACDs 12, 14, 16 may include a contact criteria 46, 48 located within a first file or field location within a script file 42, 44 and other ACDs 12, 14, 16 may save the contact criteria 46, 48 at a different file or field location.

Moreover, some ACDs 12, 14, 16 may create scripts 42, 44 using an XML mark-up code. Other ACDs 12, 14, 16 may create scripts 42, 44 using a graphical user interface (GUI) where workflows are created graphically by placing objects and connectors in a graphical diagram and where a compiler compiles the workflow scripts based upon the content, connectors and locations of objects shown on the diagram.

Included within the system 10 may be a universal workflow script 60. The universal workflow script 60 may be written by an administrative user through the terminal 28 and saved to the UCC server 26.

Alternatively, a workflow script editor 58 that may be used by an administrative user 28 to create and edit workflow scripts 42, 44 within each of the ACDs 12, 14, 16. In this regard, the user may download a scripting client 56 from the script editor 58 to the terminal 28 and enter call criteria 46, 48 and scripting instruction 50 through the client 56. The scripting client 56 may operate under an XML mark-up code format or based upon a GUI. Once the user has completed the workflow script, the created script may be sent to the script editor 58 where the script editor 58 compiles the information into a universal workflow script 60. The script editor 58 then downloads the universal script 60 to each of the ACDs 12, 14, 16 where the universal script 60 is converted into a native language of each of the respective ACDs 12, 14, 16.

Within the UCC server 26 or within each of the ACDs 12, 14, 16, a workflow script adapter 54 converts and/or otherwise maps the universal script 60 to the workflow script 42, 44 used by the individual ACDs 12, 14, 16 and, more specifically, into the scripting language used by the respective ACDs 12, 14, 16. Mapping in this case means relocating information fields (e.g., the call criteria 46, 48) based upon the individual requirements of the scripting language used by the specific ACD 12, 14, 16.

Mapping may also mean converting the instruction format from the universal script 60 to the instruction format used within the individual ACDs 12, 14, 16. For example, if the instruction format of an ACD 12, 14, 16 only allows individual verbal prompts for telephone calls in queue and the universal script 60 specifies a common prompt for all calls in a queue, then the script adapter 58 may map the single common prompt for all calls into a number of individual prompts for each call in queue for that call type.

The ability of an administrative user 28 to create a universal workflow script 60 that is translated to an equivalent script 42, 44 with substantially the same functionality within each of the ACDs 12, 14, 16 offers a number of advantages over the prior art. On one level, the ability to modify workflow scripts 42, 44 from a common location 28 allows the organization to globally accommodate special situations such as system failures or short-term promotional events.

On another level, the availability of substantially equivalent functionality of contact handling among ACDs 12, 14, 16, allows contacts may be routed to the agent 36, 38 with the most appropriate skill set without concern for differences in contact handling among the ACDs 12, 14, 16. In effect, the different steps of any individual script 42, 44 may be performed by different ACDs 12, 14, 16 based upon the availability of resources within the system 10 without departing from the script. More importantly, however, is that as information is collected from each contact, the initial classification of the type of contact involved may change. As the classification type of the contact changes, the contact may be transferred where resources are best suited to the type of contact involved.

In effect, the equivalent functionality allows the organization to write a single workflow (i.e., universal script 60) defining call treatment in terms of desired agent skills, IVR treatment, priority of call, etc. This workflow 60 is translated into the native workflow languages 42, 44 of the various systems 12, 14, 16 (e.g., Call Center, Spectrum, UIP, etc.).

At runtime (i.e., when the contact is received), the originating node (e.g., contact processor, agent assignment processor, IVR, etc.) of an ACD 12, 14, 16 initiates the workflow in its native language by first classifying the contact and then processing the contact in accordance with the script 42, 44 associated with that classification. If the contact requires functionality that one node (i.e., ACD 12, 14, 16) does not have, then the node uses a network router 66 to transfer the contact to a node of another ACD 12, 14, 16 that has the required resources. Once the other node completes the required processing step(s), it may return the call to the originating node or continue the workflow. By carrying contact information along with the contact, the contact may be handled in a consistent manner from beginning to end no matter how many nodes the contact passes through.

Within the system 10, contacts may be received by a first node (e.g., contact processor 62) located within an ACD 12, 14, 16 or within a gateway 22 in the case of VoIP contacts. Within the contact processor 62 contact associated information is collected. As described above, the contact associated information may include ANI or DNIS in the case of switched circuit telephone call or source and destination URLs in the case of Internet messages.

The contact associated information may be incorporated into a contact file 64. In addition to the contact associated information, the contact processor 62 may also search a customer database (not shown) and include customer data within the contact arrival file 64.

The contact processor 62 may transfer the contact file 64 to a workflow processor 90. Within the workflow processor 90, the contact associated information may be used to select a script 42, 44 to process the call. In this case, contact associated information may be compared with the criteria 48, 50 of each script 42, 44 to find a best match.

Once a script 42, 44 has been selected, processing of the contact may occur in accordance with the processing steps of the script 42, 44. In accordance with the script 42, 44, the contact file 64 may be forwarded to a contact broker 24. The broker 24 may be located within one of the ACDs 12, 14, 16 or be connected to the Internet 18 as shown in FIG. 1.

Within the contact broker 24 a skills selection processor 74 may process the call associated and other information to identify a minimum set of required skills 78 that would be necessary to handle the contact. The skills selection processor 74 may also identify a set of desired skills 80 for handling the contact. The skills selection processor 74 may incorporate the required skills 78 and desired skills 80 into a tender offer packet 76 that may be processed within the ACD 12, 14, 16 that originally received the contact or the contact may be forwarded through the Internet 18 to a network router 66.

If the contact broker 24 is located within an ACD 12, 14, 16 that received the contact through a local connection with the Internet 18 or PSTN 20, then the contact broker 24 may forward the contact file 64 and/or skills requirements 78, 80 to an agent selection processor 52 within the local ACD 12, 14, 16. Processing the contact within the local ACD 12, 14, 16 would be preferable in most cases to reduce data traffic within the system 10.

The local agent selection processor 52 may compare the required and desired skills 78, 80 with the skills of a local set of agents 36, 38. If a match is found, then the agent selection processor 52 may select an agent 36, 38 or agent group and transfer the contact to the selected agent 36, 38. Alternatively, if an agent is not immediately available, the agent selection processor 52 may place the contact in a queue pending availability of an agent 36, 38.

On the other hand, if a qualified agent 36, 38 is not available through the local ACD 12, 14, 16 or if the wait in queue exceeds a predetermined limit provided by the workflow 42, 44 selected for the contact, then the workflow script 42, 44 may require that the contact be transferred to an IVR 88 or another ACD 12, 14, 16. If the contact is transferred to an IVR 88, the workflow script 42, 44 may identify a set of options that are presented through the IVR 88 to the client 32, 34 to solicit more information from the client 32, 34 regarding the purpose of the call. Any information solicited from the client 32, 34 may be incorporated into the contact file 64.

Once additional information has been collected through the IVR 88 or if the workflow script requires the contact to be transferred to another ACD 12, 14, 16, the contact broker 24 may use the contact file 64 to compose another tender offer packet 76 that is tendered to other ACDs 12, 14, 16 through the network router 66.

In this case, the router 66 may function to identify and tender the contact to some subset of ACDs 12, 14, 16. Tendering the contact to a subset of ACDs 12, 14, 16 of the system 10 has the significant advantage of reducing overall message traffic within the system 10.

The subset of ACDs 12, 14, 16 selected to receive of the tendered contact may be selected at random based upon some predetermined percentage (e.g., 50%, 75%, etc.) of the ACDs 12, 14, 16. Alternatively, the distribution of tendered contacts may be skewed in favor of the ACDs 12, 14, 16 with more agents that are best situated to handle a contact. Under this scenario, the identifiers of all agents 36, 38 of the system 10 may be incorporated into a list of signed-in agents, the identifiers may be randomized, a subset of agents is selected from the randomized identifiers and contacts are tendered to the ACD 12, 14, 16 where the selected subset of agent 36, 38 are located. This has the effect that ACDs with twice as many agents on the average receive twice as many tendered contacts.

In another embodiment, the universe of ACDs 12, 14, 16 selected to receive tender offers is limited to only those ACDs having agents with the appropriate skills. In this case, an agent identification processor 72 within the broker 24 may retrieve the set of required skills 78 from the packet 76 or from the skills selection processor 74 and identify a set of qualified agents 36, 38 from an agent skills list 68 that contains a combined list of agents 36, 38 from all the ACDs 12, 14, 16. Based upon the number of identified agents located at each ACD 12, 14, 16, the agent identification processor 66 may determine a weighting to give to each ACD 12, 14, 16. Alternatively, a subset of qualified agents 36, 38 may be selected randomly and contacts tendered to the ACDs 12, 14, 16 where the selected agents 36, 38 are located.

The subset of ACDs 12, 14, 16 may be selected using a random number generator 70 within the router 66. In this case, the random numbers of the subset may be associated with the ACDs 12, 14, 16 or with the agents 36, 38 of the ACDs in the case where the subset is skewed based upon the number or skills of agents 36, 38.

Upon selection of the subset, the router 66 may forward the offers 76 to each selected ACD 12, 14, 16. Within each ACD, the tender offer is processed by an agent selection processor 52. Within the agent selection processor 52, the required skill 72 and desired skills 80 are compared with a set of skills of available agents 36, 38. In each case, the ACD 12, 14, 16 may compose a tender offer response packet 82 for transfer to the broker 24 through the router 66 with an indication of a relative match between the required and desired skills and the available agents 36, 38. The indication may include a ranking for each required and desired skills on an appropriate basis (e.g., 1-10). Alternatively, the indication may be in the form of the number of agents 36, 38 with the required skills or the number of agents with both required and desired skills. In addition, to sending the tender offer response 82 to the broker 24, the agent selection processor 52 may also mark the agent with the best relative match at each ACD 12, 14, 16 as "occupied" pending a response to the broker 24.

Within the broker 24, the tender offer responses 82 may be compared with the required skills 78, the desired skills 80 and with each other. For example, any tender offer response 82 that does not meet the required skills 78 may be discarded. If one or more tender offer response 82 meets the required skills, then the comparator 84 may compare the responses to identify the response 82 with the best match for desired skills 80. In this case, the response 82 with the best relative match between required and desired skills 78, 80 may be selected to receive the contact.

Once an ACD 12, 14, 16 is selected, a communication processor 86 within the broker 24 may transfer the contact 64 to the selected ACD 12, 14, 16. The broker 24 may also send a cancel message to any non-selected ACD 12, 14, 16 so that any agents held in reserve can be released. Once the contact 64 has been transferred to the selected ACD 12, 14, 16, the contact may be processed conventionally.

A specific embodiment of method and apparatus for selecting agents has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention and any and all modifications, variations, or equivalents that fall within the true spirit and scope of the basic underlying principles disclosed and claimed herein.

The invention claimed is:

1. A method of handling contact requests among a plurality of dissimilar automatic contact distributors comprising:
    providing a plurality of universal workflow scripts at a common location wherein universal workflow scripts comprise a set of call routing instructions for a particular type of contact;
    translating each of the plurality of universal workflow scripts into a respective native scripting language of each of the plurality of dissimilar automatic contact distributors to provide respective equivalent scripts of substantially equivalent functionality within each respective dissimilar automatic contact distributor;
    classifying a contact and processing the contact in accordance with a selected respective equivalent script selected based on the classification;
    tendering a contact request to a selected set of the plurality of dissimilar automatic contact distributors based upon processing the contact request in accordance with the selected equivalent script;
    selecting an automatic contact distributor of the selected set of the plurality of dissimilar automatic contact distributors to handle the contact based upon a response to the tendered contact request from at least some of the plurality of dissimilar automatic contact distributors; and
    transferring the contact to the selected automatic contact distributor.

2. The method of handling contact requests as in claim 1 further comprising including a set of required skills for handling the contact request in the tendered contact request.

3. The method of handling contact requests as in claim 2 further comprising including a set of desired skills for handling the contact request in the tendered contact request.

4. The method of handling contact requests as in claim 2 further comprising each of the plurality of automatic contact distributors determining whether an agent with the required skills is available.

5. The method of handling contact requests as in claim 3 wherein the step of selecting further comprises determining whether any automatic contact distributor of the plurality of automatic contact distributors has an agent with both the required and desired skills.

6. The method of handling contact requests as in claim 1 further comprising selecting the selected set of dissimilar automatic contact distributors at random and a contact broker receiving the contact from a public communication network.

7. The method of handling contact requests as in claim 6 further comprising the contact broker receiving contact associated information along with the contact.

8. The method of handling contact requests as in claim 7 further comprising the contact broker identifying a set of required skills for handling the contact from the contact associated information.

9. The method of handling contact requests as in claim 8 further comprising the contact broker identifying a set of desired skills for handling the contact from the contact associated information and wherein the contact is returned to an originating one of the dissimilar automatic contact distributors after processing in accordance with the script.

10. The method of handling contact requests as in claim 8 further comprising the contact broker composing the tendered contact request including the required and desired skills.

11. The method of handling contact requests as in claim 10 further comprising the at least some dissimilar automatic contact distributors determining whether an agent is available with the required skills and wherein the classification of the contact changes and in response the contact is transferred in accordance with the selected equivalent script to another of the plurality of dissimilar automatic contact distributor where resources are better suited to the changed classification.

12. An apparatus for handling contact requests among a plurality of dissimilar automatic contact distributors comprising:
    means for providing a plurality of universal workflow scripts at a common location wherein universal workflow scripts comprise a set of call routing instructions for a particular type of contact;
    means for translating each of the plurality of universal workflow scripts into a respective native scripting language of each of the plurality of dissimilar automatic contact distributors to provide respective equivalent scripts of substantially equivalent functionality within each respective dissimilar automatic contact distributor;
    means for tendering a contact request in response to a contact to a selected set of the plurality of dissimilar automatic contact distributors based upon processing the contact request in accordance with a selected one of the respective equivalent scripts selected based upon a classification of the contact;
    means for selecting an automatic contact distributor of the selected set of the plurality of dissimilar automatic contact distributors to handle the contact based upon a response to the tendered contact request from at least some of the plurality of dissimilar automatic contact distributors; and
    means for transferring the contact to the selected automatic contact distributor.

13. The apparatus for handling contact requests as in claim 12 further comprising means for including a set of required skills for handling the contact request in the tendered contact request.

14. The apparatus for handling contact requests as in claim 13 further comprising means for including a set of desired skills for handling the contact request in the tendered contact request.

15. The apparatus for handling contact requests as in claim 14 further comprising means within each of the plurality of automatic contact distributors for determining whether an agent with the required skills is available.

16. The apparatus for handling contact requests as in claim 14 wherein the means for selecting further comprises means for determining whether any automatic contact distributor of the plurality of automatic contact distributors has an agent with both the required and desired skills.

17. The apparatus for handling contact requests as in claim 12 further comprising a contact broker for receiving the contact from a public communication network.

18. The apparatus for handling contact requests as in claim 17 further comprising contact associated information received by the broker along with the contact.

19. The apparatus for handling contact requests as in claim 18 further comprising means within the contact broker for identifying a set of required skills for handling the contact from the contact associated information.

20. The apparatus for handling contact requests as in claim 19 further comprising means within the contact broker for identifying a set of desired skills for handling the contact from the contact associated information.

21. The apparatus for handling contact requests as in claim 19 further comprising means within the contact broker for composing the tendered contact request including the required and desired skills.

22. The apparatus for handling contact requests as in claim 21 further comprising means within the at least some dissimilar automatic contact distributors for determining whether an agent is available with the required skills.

23. An apparatus for handling contact requests among a plurality of dissimilar automatic contact distributors comprising:
- a central server that provides a plurality of universal workflow scripts at a common location wherein universal workflow scripts comprise a set of call routing instructions for a particular type of contact;
- a workflow script adapter for translating each of the plurality of universal workflow scripts into a respective native scripting language of each of the plurality of dissimilar automatic contact distributors to provide respective equivalent scripts of substantially equivalent functionality within each respective dissimilar automatic contact distributor;
- a contact broker that tenders a contact request in response to receiving a contact to a selected set of the plurality of dissimilar automatic contact distributors based upon processing the contact in accordance with a selected one of the respective equivalent scripts selected based upon a classification of the contact;
- a comparator that selects an automatic contact distributor of the selected set of the plurality of dissimilar automatic contact distributors to handle the contact based upon a response to the tendered contact request from at least some of the plurality of dissimilar automatic contact distributors; and
- a communication processor that transfers the contact to the selected automatic contact distributor.

24. The apparatus for handling contact requests as in claim 23 further comprising a set of required skills for handling the contact request included within the tendered contact request.

25. The apparatus for handling contact requests as in claim 24 further comprising a set of desired skills for handling the contact request included within the tendered contact request.

26. The apparatus for handling contact requests as in claim 25 further comprising an agent selection processor within each of the plurality of automatic contact distributors for determining whether an agent with the required skills is available.

27. The apparatus for handling contact requests as in claim 25 further comprises an agent selection processor that determines whether any automatic contact distributor of the plurality of automatic contact distributors has an agent with both the required and desired skills.

28. The apparatus for handling contact requests as in claim 23 further comprising a contact broker for receiving the contact from a public communication network.

29. The apparatus for handling contact requests as in claim 28 further comprising contact associated information received by the broker along with the contact.

30. The apparatus for handling contact requests as in claim 29 further comprising a skills selection processor within the contact broker identifies a set of required skills for handling the contact from the contact associated information.

31. The apparatus for handling contact requests as in claim 30 further comprising a skills selection processor within the contact broker that identifies a set of desired skills for handling the contact from the contact associated information and wherein different steps of the selected equivalent scripts are performed by different ones of the plurality of dissimilar automatic contact distributors based upon availability of resources without departing from the selected equivalent script.

* * * * *